Figure 7:
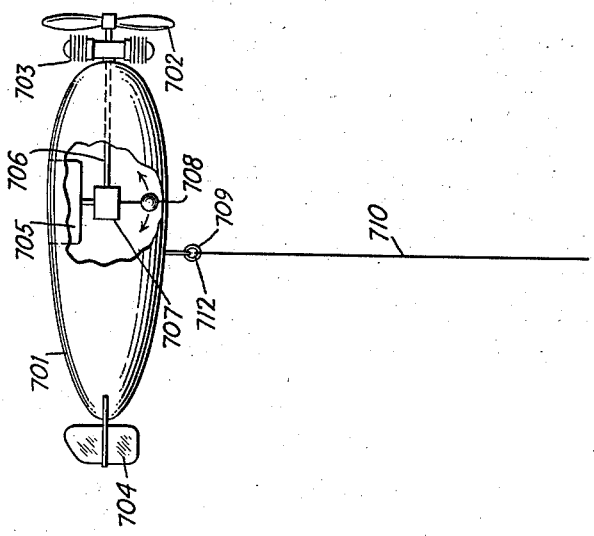

Dec. 30, 1947.  M. G. CROSBY  2,433,344
AERONAUTIC POSITIONING DEVICE
Filed May 29, 1943   2 Sheets-Sheet 1
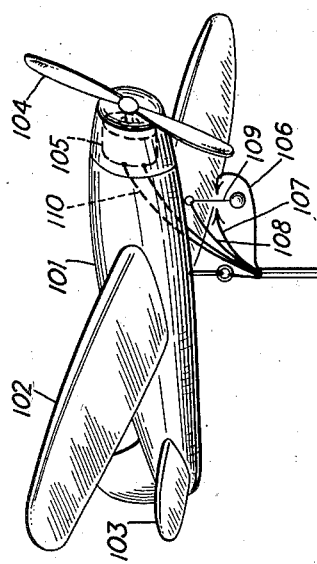
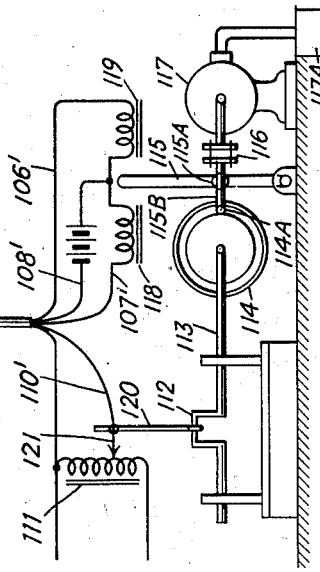
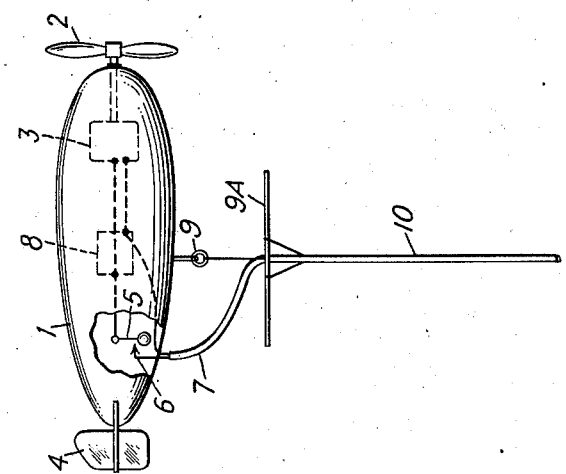
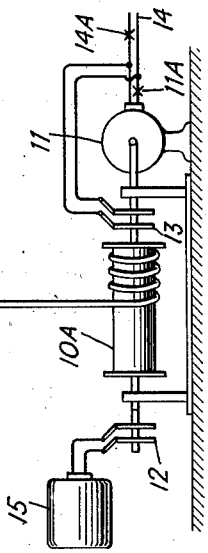
INVENTOR.
MURRAY G. CROSBY
BY H.S.Grover
ATTORNEY Dec. 30, 1947.  M. G. CROSBY  2,433,344
AERONAUTIC POSITIONING DEVICE
Filed May 29, 1943  2 Sheets-Sheet 2

INVENTOR.
MURRAY G. CROSBY
BY H. G. Grover
ATTORNEY

Patented Dec. 30, 1947

2,433,344

UNITED STATES PATENT OFFICE 2,433,344

AERONAUTIC POSITIONING DEVICE

Murray G. Crosby, Riverhead, N. Y., assignor to Radio Corporation of America, a corporation of Delaware Application May 29, 1943, Serial No. 488,973

9 Claims. (Cl. 244—33)

This invention relates to a new and useful automatic positioning device.

An object of this invention is to provide an aeronautic positioning device which will automatically stabilize a balloon, an airplane or helicopter in a desired position above the surface of the earth irrespective of wind and atmospheric conditions.

Another object of this invention is to provide an aeronautic positioning device which will be particularly adapted to support an antenna, meteorological or radiosonde weather determining devices and to retain them in a desired predetermined position above the surface of the earth.

Still another object of this invention is the propulsion of a captive balloon or airplane above the surface of the earth to maintain it in a position by means of an automatically controlled motor driving a propeller which compensates for the aircraft drift due to wind.

A feature of this invention is an arrangement wherein the aeronautic buoyant device has contained therein a motor device and a pivoted weight or pendulum which is arranged to be acted upon by gravity to control a throttle of a gas engine or electrical contacts which are connected to an electric motor so that the throttle or contacts open and close to actuate the respective motor device for rotating a propeller to automatically stabilize the buoyant device in a desired position.

In the prior art aeronautic devices for retaining weather determining devices or for supporting a radio antenna, an ordinary kite or small captive balloon has been used. Such devices have several disadvantages primarily because they are dependent greatly upon the strength and direction of the wind for their position and height above the ground. It is the purpose of this invention to provide a means for eliminating these disadvantages. This is accomplished by this invention by having the aircraft device provided with a small light weight gas engine or electric motor which drives an air propeller, the rotation of which is governed by means of a pendulum whose position is determined by gravity. The pendulum acts to change the means which controls the rotation of the motor, the aeronautic device being anchored to the ground by a cable and maintained in a desired position by means of the automatically controlled motor driving the propeller to compensate for the drift due to the wind.

Figure 4:
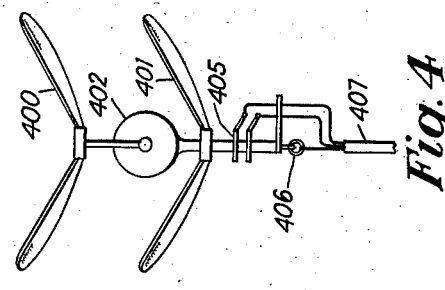
Figure 3:
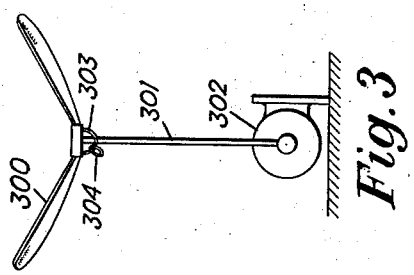
Figure 5:
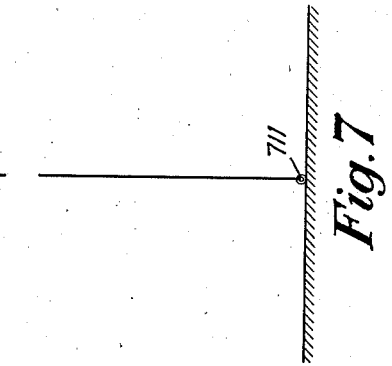
Figure 6:
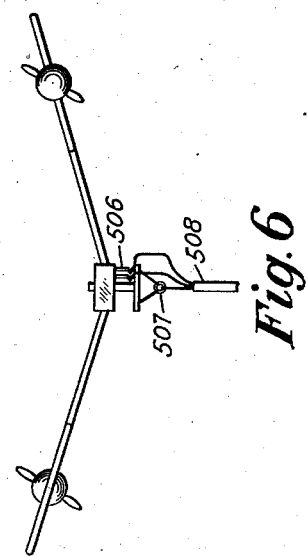

This invention will best be understood by reference to the accompanying drawings, in which:

Fig. 1 shows a specific embodiment of the invention,

Fig. 2 is another embodiment of the invention employing a sail-plane for the buoyant device, Fig. 3 shows an embodiment employing the principle of the helicopter as a buoyant device, Fig. 4 is another modification of Fig. 3 wherein two helicopter propellers are employed, Fig. 5 is a top view of a further modification of a helicopter type of buoyant device, Fig. 6 is a front view of Fig. 5, and Fig. 7 shows still another embodiment of Fig. 1 which employs a gas engine.

Referring now in detail to Fig. 1 of the drawing, a streamlined balloon 1 is shown as being utilized for the buoyant device. At one end of the buoyant device 1 there is located a propeller 2 which is adapted to pull the balloon into the wind. A light-weight electric motor 3 is located adjacent propeller 2. A tailpiece 4 keeps the balloon 1 headed into the wind in a manner similar to that of a weather vane. Located in the central portion of the balloon is a swinging weight or pendulum 5 which is held in a vertical position by gravity. Adjacent the pendulum 5 is an electrical contact 6 which together with a contact on pendulum 5 forms a switching means which starts and stops the motor 3.

The motor 3 obtains its operating power through a cable 7 which extends to the ground, or if desired the balloon may have a self-contained battery 8 shown by the broken lines. Secured to the outer portion of the balloon at a central location is a device 9 for retaining the antenna 9a. The antenna 9a may be a horizontal dipole, as shown, or that of the vertical type which has its lead-in retained within a cable 10 which is wound upon a winch 10a. The winch 10a is secured to the ground by any suitable anchoring means. Another motor 11 drives the winch 10a to pull the balloon up or down and may be controlled by means of a suitable manual operated switch 11a.

The electrical connections between motor 3, switch contact 6, and a source of power connected to the terminals 14 are carried through cable 10. Connections are also made between the antenna 9a to any suitable instruments or radio apparatus located on the ground and are carried through the cable 10. The connection to the radio apparatus is preferably made by a high frequency coaxial conductor to the lead-ins on the apparatus by means of slip rings 12 and terminals 15. The power to supply motor 3, if the device does not have a self-contained battery, is fed through slip rings 13. Power for both the winch motor 11 and the propeller motor 3 is fed through the terminals 14 which connect to any suitable source of electrical power.

In the operation of this improved device of my invention, when the wind tends to drive the balloon backward, the pendulum is tilted by the action of gravity and its metal surface makes electrical connection with contact 6 and thus completes the circuit through starting motor 3 which rotates propeller 2 and moves the balloon forward. When the propeller has pulled the balloon sufficiently forward, the pendulum will then assume a vertical position due to the action of gravity and the connection between the pendulum and contact 6 will then be broken, thus stopping the rotation of the motor and propeller 2. This type of intermittent switching arrangement produces an oscillation movement of the buoyant device so that the motor is continuously stopping and starting but the pendulum is adjusted so that the amount of travel of the balloon is limited to a predetermined radius above the anchor.

Fig. 2 shows a type of aeronautic anchor device in which wings and tail structure similar to an air- or sail-plane is added to the buoyant device. The airplane consists of a fuselage 101, wing 102, tailpiece 103, a propeller 104 and a self-contained motor 105. Adjacent motor 105 are contacts 106 and 107 which are connected to leads 106' and 107'. A contact 108 connects to a swinging weight or pendulum 109. The contacts 106 and 107 are arranged on either side of the pendulum 109 which is connected by leads 107' and 108' to ground. A. C. or D. C. power is fed to the motor 105 through leads 110 and 110' and through a variable auto-transformer 111. The speed of the motor 105 is controlled by means of a device similar to a Goddard Patent 2,184,958 which is actuated by the pendulum 109 and contacts 106 and 107. A crank shaft 112 is connected to a shaft 113 and a fly-wheel 114 which is mounted for rotation on one end of shaft 113. The outer periphery of the fly-wheel 114 has an annular slot 114A. A pivoted arm 115 has a slot 115A which is positioned to engage a friction drive shaft 115B. Drive shaft 115B is mounted for rotation in slot 114A and engages either side wall, depending upon the position of arm 115. A flexible coupling 116 is interposed between electrical motor 117 and arm 115. Two solenoids 118 and 119 are located on each side of the pivoted arm 115, the windings of which are electrically connected to contacts 106 and 107 through leads 106', 107' and 108'. Link 120 is linked to crank shaft 112 and is connected to a sliding arm 121 for varying the tap on the speed control auto-transformer 111.

In the operation of this device the pendulum 109 is actuated by gravity and makes electrical connection either to the right-hand contact 106 or the left-hand contact 107, dependent upon the position of the airplane with respect to its anchor. Power is fed from any suitable source 117A to the motor 117 through the variable auto-transformer 111 to leads 110 and 110'. The speed of the elevated motor 105 is controlled by means of the position of pendulum 109 which is connected to the lead 108. It will be seen that when the wind forces the plane in a backward position, the pendulum connects leads 107 and 108 which correspond to leads 107' and 108' located on the ground. This electrical connection energizes the solenoid 118 located on the left of arm 115 and thus pulls arm 115 over to the left causing the friction drive shaft 119 to engage the inside wall of the slot 114A in wheel 114 so that the motor 117, which is continuously running, rotates shaft 113 in an opposing direction from that of shaft 115B. The rotation of shaft 113 then turns crank shaft 112 so as to move the arm 120 to vary the tap 121 on the speed control auto-transformer 111 in a direction which will increase the speed of motor 105 and thereby pull the plane forward or back into the wind. If the wind should subside, the pendulum 109 will then make connection to contact 106 and thus energize solenoid 119 which will pull arm 115 to the outside wall of the slot in wheel 114 so that the motor 117 drives shaft 113 in the opposite direction to that caused by the energizing of the solenoid 118 and in the same direction as shaft 119. This position shifts the location of the tap 121 on the variable auto-transformer 111 in the opposite direction so as to reduce the speed of motor 105 to compensate for the fact that the wind has subsided. In this way the speed of the propeller is thus made proportional to the strength of the wind and the airplane is then held in one position.

The helicopter type of buoyant device shown in Figs. 3 and 4 functions similarly to the above mentioned devices but uses the principle of the helicopter as the buoyant device. By using dihedral angles on the blades of the helicopter, forces are set up which restore the device to the vertical position when the wind tends to cause it to lean. For example, in Fig. 3 the helicopter blade 300 is connected to a flexible drive shaft 301 and driven by a motor 302 which is mounted on the ground. The antenna is supported by ring 304 mounted on a swivel collar 303 which is arranged to allow rotation with respect to the helicopter blades. In Fig. 4 the helicopter is provided with two propellers 400 and 401 which are driven by a motor 402. One propeller is connected directly to the shaft of the motor 402 and the other to the frame of motor 402. The movement of the propellers is arranged so that they both exert an upward pull, but will rotate in opposite directions. Power is supplied to the motor 402 through slip rings 405. Ring 406 is swivelled to the bottom propeller 401 and is arranged for attaching the anchor cable which has a member 407 attached to it for mounting the slip ring contacts.

In Figs. 5 and 6 there is shown a type of helicopter having blades 502 and 502' which are rotated by propellers 504 and 504' and are driven by electric motors 503 and 503'. These blades are mounted on hub 500 by the arms 501 and 501'. Power is supplied to the motors by means of slip rings 506 which have their contacts mounted on a swivel collar 507 and an anchor ring 507'. Voltage for the motors is supplied from the ground through a cable 508. As will be seen from the showing in Fig. 6 this helicopter device also has a dihedral angle to maintain the buoyant device in the vertical position.

The embodiment shown in Fig. 7 includes a buoyant device 701 having a propeller 702 which is adapted to pull the balloon into the wind and is driven by a light weight gasoline engine 703. A tailpiece 704 maintains the buoyant device headed into the wind. A gasoline tank 705 is located within the buoyant device 701. A gasoline line 706 connects the gasoline engine 703 with the gasoline tank 705. Interposed between the gasoline line 706 and the gasoline tank 705 is a valve or gasoline throttle 707. The amount of gasoline is controlled by having the pendulum 708 operate the throttle 707, the increase in gasoline flow being accomplished by having the pendulum 708 swing to the left which will increase the flow of gasoline to the engine 703, thus causing the propeller 702 to draw the buoyant device forward. The buoyant device 701 is attached to a retaining device 709 which is connected by means of a cable 710 to the anchoring device or winch 711. The antennae or any other instruments are fastened at 712.

This invention should not be limited to the precise modifications shown for the reason that the buoyant devices of Figs. 1 and 2 could be combined to form a combination balloon and plane which would have enough balloon buoyancy to rise to moderate heights, but in the presence of a strong wind would have increased buoyancy. This would allow the balloon to pull the plane up to a level where the wind is usually stronger. The best position for the balloon or plane would be with a slight backward lean so that the anchor cable would exert a force which would keep the device from drifting to one side. In such a case, the adjustment of the pendulum contacts would determine the amount of the lean.

Furthermore, although in Fig. 1 the antenna is shown mounted directly beneath the balloon, such an arrangement would not have to be adhered to. For example, two such balloons could be used to support the two ends of an antenna or any suitable meteorological devices. Or three balloons could be used to support the three points of a V-type antenna.

In a calm when no wind is blowing the embodiment shown by Fig. 1 will function best as the rotation of the motor 3 can be stopped by means of a switch 14A located on the ground.

While I have indicated and described a system for carrying my invention into effect, it will be apparent to one skilled in the art that my invention is by no means limited to the particular mechanism shown and described, but that many modifications may be made without departing from the scope of my invention.

What I claim is:

1. An automatic positioning aeronautic captive device comprising a buoyant device, propulsion means including gravity actuated electrical contacts located on said buoyant device, control means within said buoyant device to control said propulsion means, ground anchorage means including a source of voltage, an electric motor, an electric cable connected between said source of voltage, said electric motor and said control means to keep said buoyant device in a vertical position above said ground anchorage means, a second electric motor, a winch, a shaft coupled between said winch and said second motor, an antenna device, two groups of collector rings, one group being connected to the antenna device by said cable, the other group being connected by said cable to said source of voltage and said control means, the arrangement being such that the cable length is controlled by rotation of said second motor to govern the cable length and vertical position of said buoyant device.

2. An automatic positioning aeronautic device comprising an aircraft device, a dipole antenna secured to and located beneath said aircraft device, propulsion means including a propeller located on said aircraft device, an electric motor for driving said propeller, control means including a gravity operated switch located within said aircraft device to control said propulsion means, ground anchorage means for said aircraft device, a source of voltage, an electric cable connected between said source of voltage, said electric motor and said control means being located at said ground anchorage means and arranged to govern the height and location of said device vertically above said anchorage means, and connection leads from said dipole antenna to the ground anchorage means.

3. An automatic positioning aeronautic device comprising a buoyant device, an antenna member secured to said buoyant device, ground anchorage means to anchor said buoyant device, propulsion means including a propeller located on said buoyant device, a motor for driving said propulsion means, control means for said motor including a gravity operated switch to control said propeller to keep said buoyant device in a vertical position above said anchorage means, a source of voltage, an electric cable connected between said source of voltage and said motor and said control means to govern the height and vertical position of said buoyant device with respect to said ground anchorage means, and connection leads from said antenna member to said anchorage means.

4. An automatic positioning aeronautic device comprising an air-ship having wings and tail, propulsion means located on said air-ship, a motor for said propulsion means, a gravity actuated motor control means located within said air-ship, ground anchorage means including a source of voltage, an electric cable connected between said source of voltage and said motor control means to govern the position of said air-ship in a predetermined location above said anchorage means, and an antenna device secured to and located below said air-ship, connection leads from the antenna device to said anchorage means, said connection leads being located within said cable.

5. An automatic positioning aeronautic captive device comprising an air-ship, propulsion means located in said air-ship, an electric motor for said propulsion means, motor control means including gravity actuated electrical contacts located within said air-ship to control said motor and the propulsion means, ground anchorage means for said air-ship, a source of voltage, a cable connected between said air-ship and said ground anchorage means, said ground anchorage means also including an electric motor, a winch, a shaft which is coupled between said winch and said electric motor, an antenna device secured to and located below said air-ship, a pair of collector rings on said shaft, one group of said collector rings being connected to said antenna device by a pair of connection leads within said cable, the other pair of collector rings being connected from said source of voltage by connection leads within said cable to said motor control means in such manner that the position of said air-ship above said anchorage means in controlled by rotation of said first mentioned electric motor, and a manually operated switch connected to said second mentioned electric motor to govern the length of said cable and the height of said air-ship above said anchorage means.

6. An automatic positioning aeronautic device comprising a helicopter having rotatable blades, a dipole antenna secured to and located below the blades of said helicopter, ground anchorage means for said helicopter, a power device located on the earth's surface and forming part of said anchorage means, a flexible shaft coupling the blades of said helicopter with said power device to control the position of the helicopter in a predetermined location above the anchorage means.

7. An automatic positioning aeronautic device comprising a helicopter having two propellers, a motor for rotating said propellers, one of said propellers being connected to the shaft of said motor, the other propeller being connected to the frame of said motor whereby an upward pull is exerted as the propellers rotate in opposite directions, an antenna member secured to and located below the propellers of said helicopter, anchorage means located on the earth's surface, an anchor cable attached to said anchorage means and coupled between the motor which is connected to one of said propellers, said cable being arranged to control the position of the helicopter in a predetermined locotion above the anchorage means.

8. An automatic positioning aeronautic device comprising a helicopter having a pair of rotatable blades, an electric motor mounted on each blade, a fan mounted on a shaft of each motor, an antenna member secured to and located below said blades, anchorage means and a source of voltage located on the ground, a cable connecting said source of voltage with each one of said electric motors, whereby the rotatable blades will keep said helicopter in a vertical position above the anchorage means on the ground.

9. An automatic positioning aeronautic device comprising an air-ship, propulsion means including an electric motor and a propeller located on said air-ship, control means including gravity actuated contacts serving as an electric switch for said motor, anchorage means including a source of voltage and a second electric motor located on the ground, an electric cable connected to said source of voltage and said gravity actuated contacts, a rotatable crank, a pair of solenoids having a central armature, a friction drive connecting said rotatable crank shaft to said second electric motor, an auto transformer connected by said cable to said first electric motor, whereby the speed of said first mentioned motor is controlled by means of said solenoids to govern the vertical position of said buoyant device above the anchorage means.

MURRAY G. CROSBY.

REFERENCES CITED

The following references are of record in the file of this patent:

UNITED STATES PATENTS

| Number | Name | Date |
| --- | --- | --- |
| 1,523,926 | Ypma | Jan. 20, 1925 |
| 1,669,758 | Isacco | May 15, 1928 |
| 1,017,200 | Brackett | Feb. 13, 1912 |
| 1,032,651 | Brackett | July 16, 1912 |
| 1,275,710 | Lewis | Aug. 13, 1918 |
| 1,993,414 | Respress | Mar. 5, 1935 |
| 1,002,067 | MacManus | Aug. 29, 1911 |
| 2,099,808 | Havill | Nov. 23, 1937 |
| 1,942,954 | Edwards | Jan. 9, 1934 |
| 1,389,925 | Zurovec | Sept. 6, 1921 |
| 1,788,218 | Wettstein | June 6, 1931 |
| 1,648,934 | Brinkmann | Nov. 15, 1927 |

FOREIGN PATENTS

| Number | Country | Date |
| --- | --- | --- |
| 518,068 | Great Britain | Feb. 16, 1940 |
| 846,805 | France | June 19, 1939 |
| 515,161 | Germany | Dec. 31, 1930 |
| 496,502 | Great Britain | Dec. 1, 1938 |
| 409,582 | France | Apr. 6, 1910 |